United States Patent
Jhu et al.

(10) Patent No.: US 12,184,870 B2
(45) Date of Patent: Dec. 31, 2024

(54) METHODS AND APPARATUS OF SEGMENT-BASED VIDEO CODING USING PALETTE MODE

(71) Applicant: BEIJING DAJIA INTERNET INFORMATION TECHNOLOGY CO., LTD., Beijing (CN)

(72) Inventors: Hong-Jheng Jhu, Beijing (CN); Xiaoyu Xiu, Beijing (CN); Xianglin Wang, Beijing (CN); Yi-Wen Chen, Beijing (CN); Tsung-Chuan Ma, Beijing (CN); Shuiming Ye, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 310 days.

(21) Appl. No.: 17/538,934

(22) Filed: Nov. 30, 2021

(65) Prior Publication Data

US 2022/0086464 A1    Mar. 17, 2022

Related U.S. Application Data

(63) Continuation of application No. PCT/US2020/035078, filed on May 29, 2020.
(Continued)

(51) Int. Cl.
*H04N 19/186* (2014.01)
*H04N 19/119* (2014.01)
(Continued)

(52) U.S. Cl.
CPC ........ *H04N 19/186* (2014.11); *H04N 19/119* (2014.11); *H04N 19/129* (2014.11);
(Continued)

(58) Field of Classification Search
CPC .. H04N 19/186; H04N 19/119; H04N 19/129; H04N 19/146; H04N 19/157; H04N 19/176; H04N 19/70
See application file for complete search history.

(56) References Cited

U.S. PATENT DOCUMENTS 10,148,977 B2    12/2018    Yu et al.
2008/0159639 A1*    7/2008    Dvir ...................... H04N 19/17
                                                                 382/236
(Continued)

FOREIGN PATENT DOCUMENTS

JP         4097873        *    3/2000
KR    20170118873 A    *    3/2016

OTHER PUBLICATIONS

Hideyasu Candy, translation of JP 4097873 Jan. 2013 (Year: 2013).*

(Continued)

*Primary Examiner* — Zaihan Jiang
(74) *Attorney, Agent, or Firm* — Oblon, McClelland, Maier & Neustadt, L.L.P.

(57) ABSTRACT

A method of decoding video data is performed by an electronic apparatus. The electronic apparatus receives, from a video bitstream, one or more syntax elements indicating that a coding block is coded under a palette mode. The electronic apparatus divides the coding block into multiple segments, each of the multiple segments having a set of index values that is independent from another one of the multiple segments. The electronic apparatus receives, from the video bitstream, index values associated with each of the multiple segments and a palette table associated with the coding block and decodes the multiple segments in parallel according to the index values and the palette table associated with the coding block.

20 Claims, 10 Drawing Sheets

Related U.S. Application Data

(60) Provisional application No. 62/855,628, filed on May 31, 2019.

(51) Int. Cl.
  H04N 19/129 (2014.01)
  H04N 19/146 (2014.01)
  H04N 19/157 (2014.01)
  H04N 19/176 (2014.01)
  H04N 19/70 (2014.01)

(52) U.S. Cl.
  CPC ......... H04N 19/146 (2014.11); H04N 19/157 (2014.11); H04N 19/176 (2014.11); H04N 19/70 (2014.11)

(56) References Cited

U.S. PATENT DOCUMENTS

| | | | | |
|---|---|---|---|---|
| 2009/0010533 | A1* | 1/2009 | Hung | H04N 19/44 382/166 |
| 2009/0167785 | A1* | 7/2009 | Wong | G06T 15/503 345/629 |
| 2011/0170771 | A1* | 7/2011 | Yang | H04N 19/186 382/162 |
| 2012/0033852 | A1* | 2/2012 | Kennedy | G06V 10/7715 382/103 |
| 2013/0148947 | A1* | 6/2013 | Glen | H04N 9/8042 386/355 |
| 2013/0156309 | A1* | 6/2013 | Yao | H04N 1/644 382/166 |
| 2013/0162911 | A1* | 6/2013 | Glen | H04N 21/47 348/586 |
| 2015/0186100 | A1* | 7/2015 | Tsai | H04N 19/44 375/240.12 |
| 2016/0373756 | A1* | 12/2016 | Yu | H04N 19/119 |
| 2017/0318302 | A1* | 11/2017 | Ye | H04N 19/70 |
| 2019/0028718 | A1* | 1/2019 | Koyama | H04N 19/46 |

OTHER PUBLICATIONS

Zhu Weijia translation of KR 20170118873 Nov. 1, 2014 (Year: 2014).*
Beijing Dajia Internet Information Technology Co. Ltd et al., International Search Report and Written Opinion, PCT/US2020/035078, Sep. 11, 020, 9 pgs.
Yung-Hsuan Chao et al., "CE8-related: Line-based CG Palette Mode," Joint Video Experts Team (JVET) of ITU-T SG 16 WP 3 and ISO/IEC JTC 1/SC 29/WG 11, 14th Meeting: Geneva, CH, Mar. 19-27, 2019, [Document: JVET-N0550], 3 pgs., retrieved from http://phenix.int-evry.fr/jvet/.
Yung-Hsuan Chao et al., "CE8: Palette Mode in HEV (CE8-2.1)," Joint Video Experts Team (JVET) of ITU-T SG 16 WP 3 and ISO/IEC JTC 1/SC 29/WG 11, 14th Meeting: Geneva, CH, Mar. 20, 2019, [Document: JVET-N0344], 8 pgs. retrieved from http://phenix.int-evry.fr/jvet/.
Y-H Chao (Qualcomm) et al: "CE8-related: Line-based CG Palette Mode", 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N0550 Mar. 16, 2019 (Mar. 16, 2019), XP030203321; 4 pgs.
Xu M et al: "Non-CE1: Index Map Splitting (IMS) Mode for Palette Coding in HEVC SCC", 21. JCT-VC Meeting; Jun. 19, 2015-Jun. 26, 2015; Warsaw; (Joint Collaborative Team on Video Coding of ISO/IEC JTC1/SC29/WG11 and ITU-T SG.16), No. JCTVC-U0149 Jun. 18, 2015 (Jun. 18, 2015), XP030241583; 4 pgs.
Sun Yu-Chen et al: "Palette mode—A new coding tool in screen content coding extensions of HEVC", 2015 IEEE International Conference on Image Processing (ICIP), IEEE, Sep. 27, 2015 (Sep. 27, 2015), pp. 2409-2413, XP032826856; 6 pgs.

* cited by examiner

METHODS AND APPARATUS OF SEGMENT-BASED VIDEO CODING USING PALETTE MODE

CROSS-REFERENCE TO RELATED APPLICATIONS

This application is a continuation of PCT Application No. PCT/US2020/035078, entitled "METHODS AND APPARATUS OF SEGMENT-BASED VIDEO CODING USING PALETTE MODE" filed on May 29, 2020, which claims the benefit of U.S. Provisional Application No. 62/855,628, entitled "VIDEO CODING USING PALETTE MODE" filed on May 31, 2019, both of which are incorporated herein by reference in their entirety.

TECHNICAL FIELD

The present application generally relates to video data coding and compression, and in particular, to method and system of segment-based video coding using palette mode.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of video data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to system and method of video encoding and decoding using palette mode.

According to a first aspect of the present application, a method of decoding video data includes: receiving, from a video bitstream, one or more syntax elements indicating that a coding block is coded under a palette mode; dividing the coding block into multiple segments, wherein each of the multiple segments has a set of index values that is independent from another one of the multiple segments; receiving, from the video bitstream, index values associated with each of the multiple segments and a palette table associated with the coding block; and decoding the multiple segments in parallel according to the index values and the palette table associated with the coding block.

According to a second aspect of the present application, an electronic apparatus includes one or more processing units, memory and a plurality of programs stored in the memory. The programs, when executed by the one or more processing units, cause the electronic apparatus to perform the method of decoding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
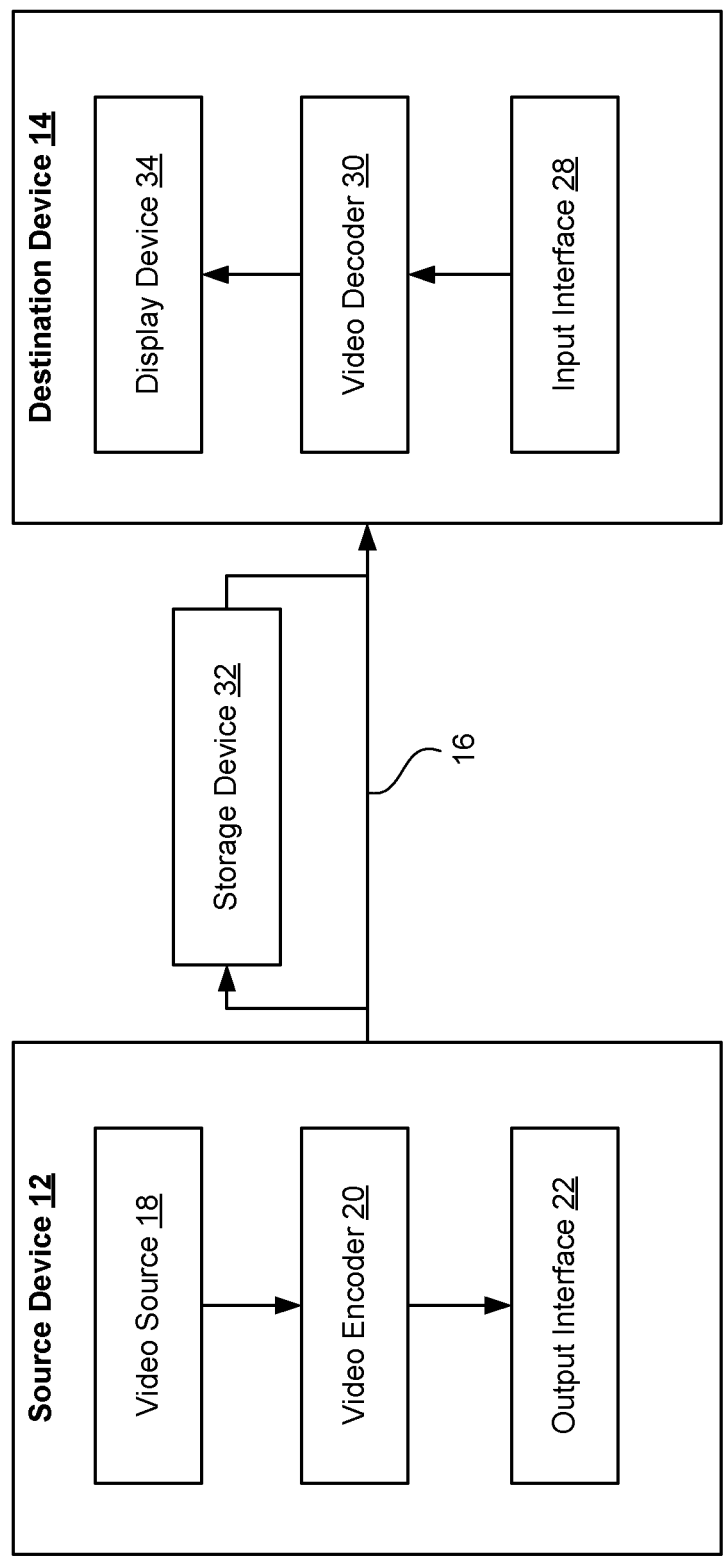
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
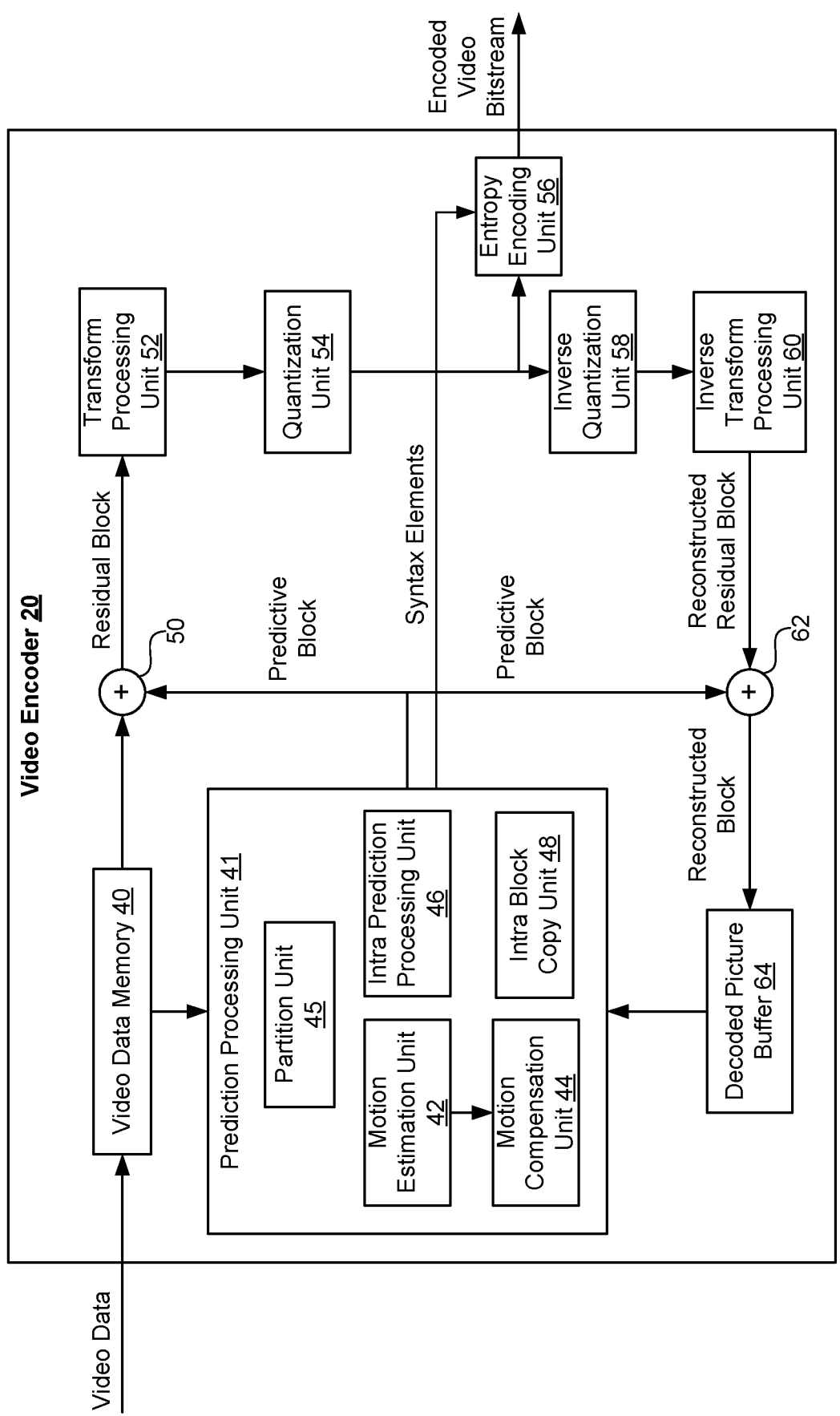
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
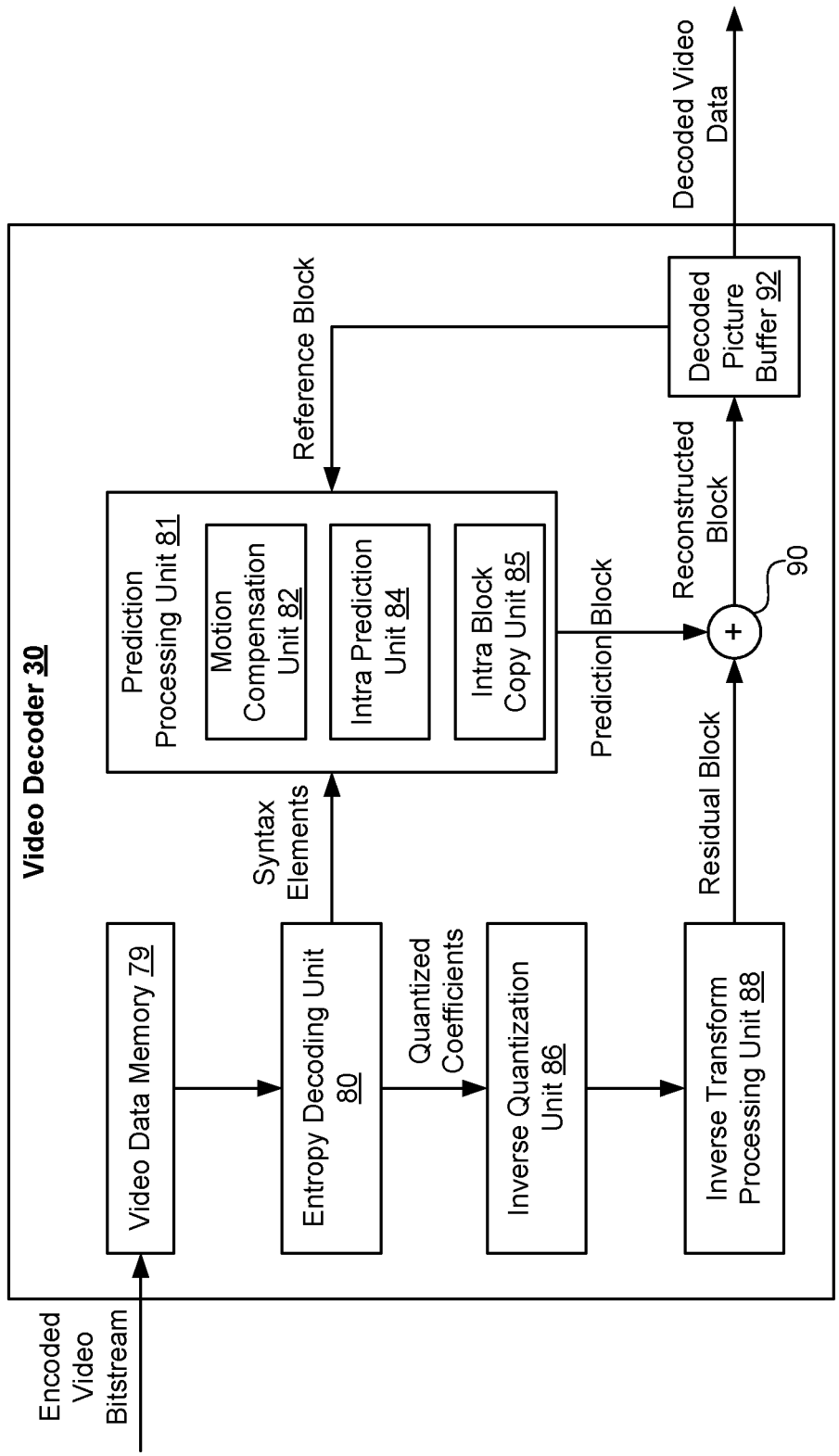
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
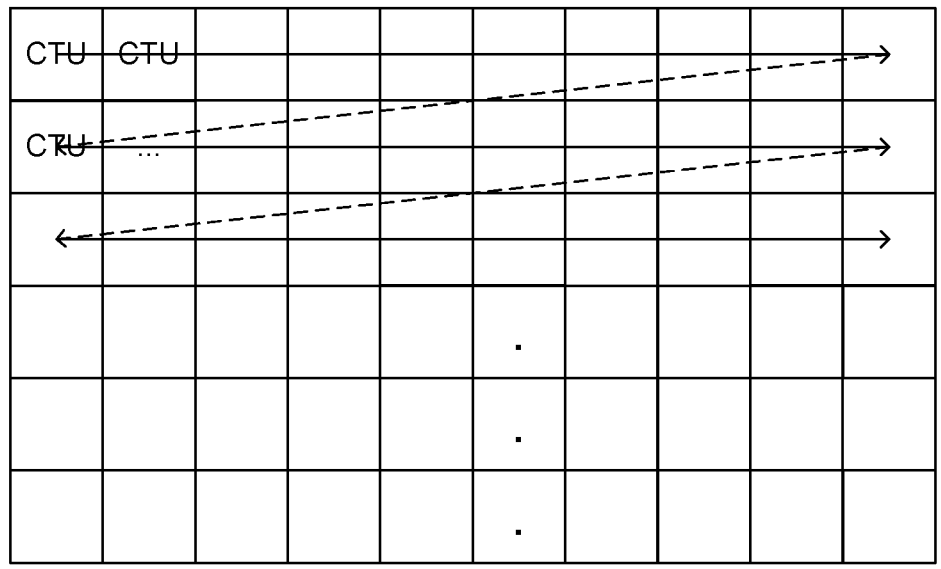
FIGS. 4A through 4E are block diagrams illustrating how a frame is recursively partitioned into multiple video blocks of different sizes and shapes in accordance with some implementations of the present disclosure.
Figure 4B:
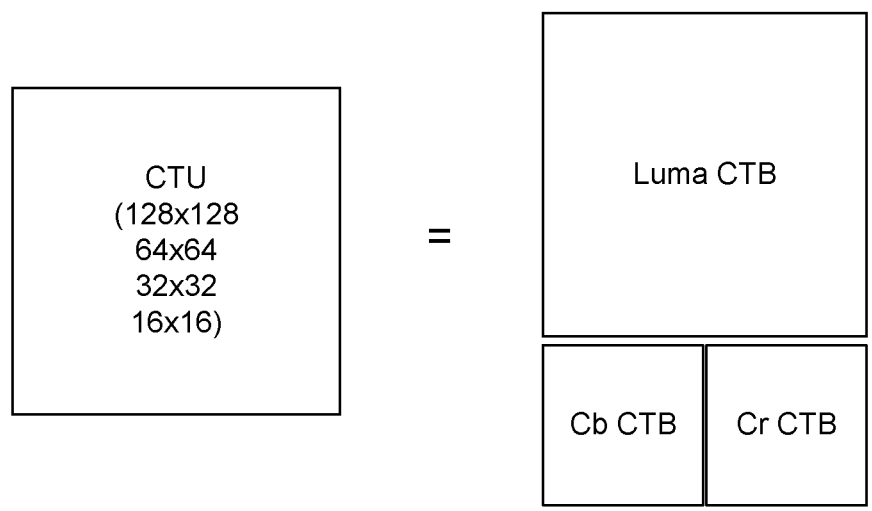

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
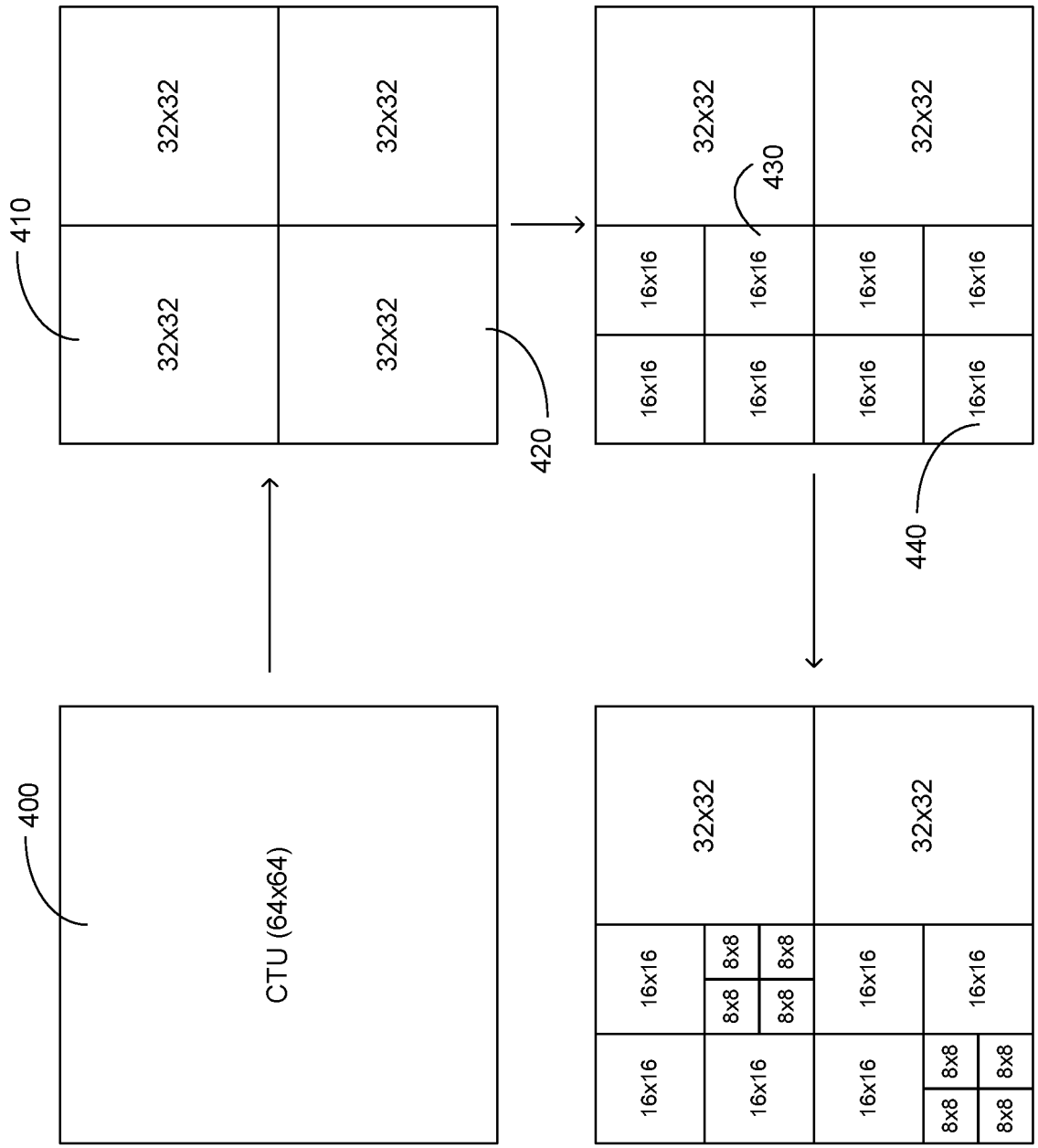
Figure 4D:
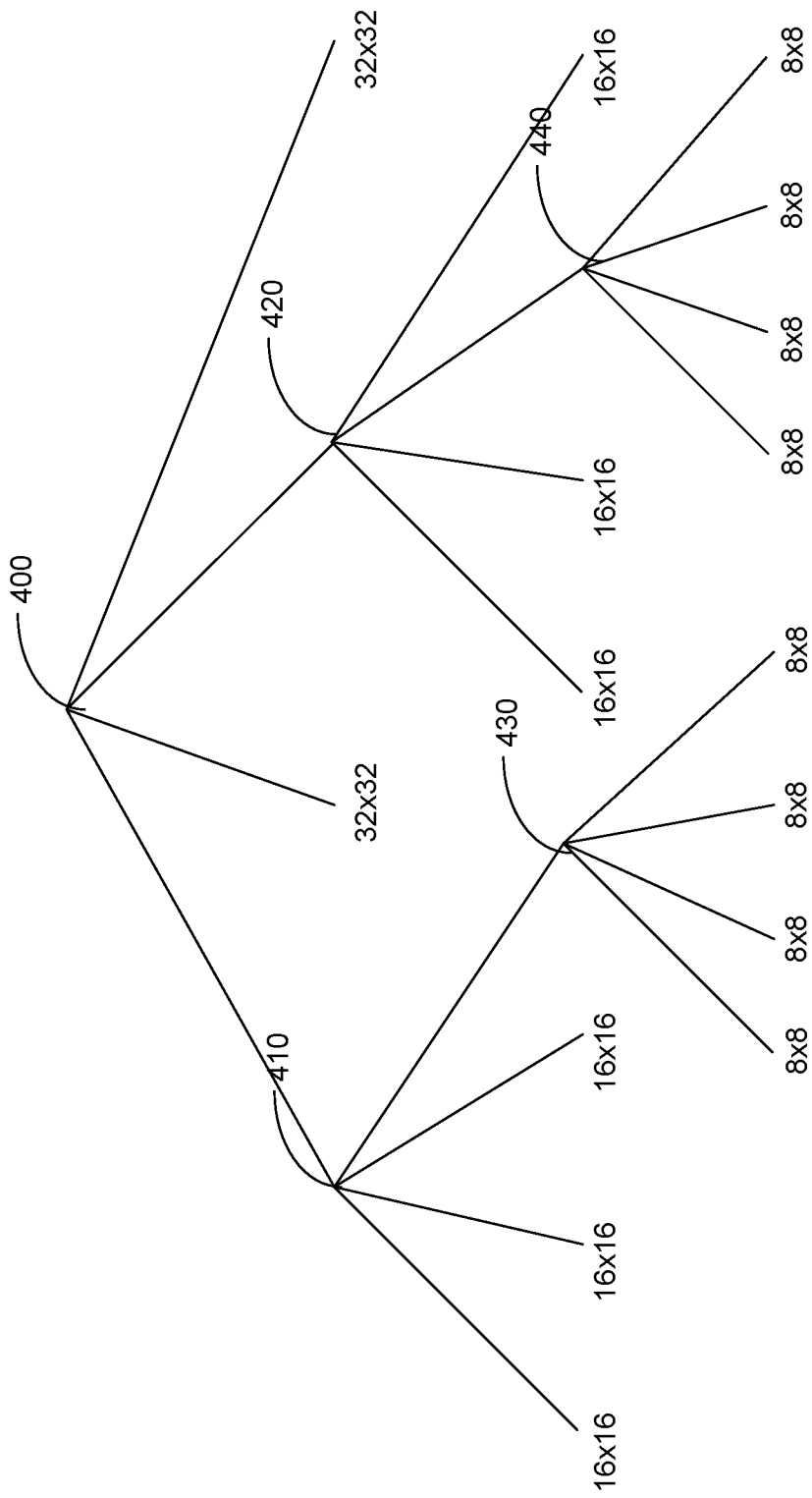
Figure 4E:
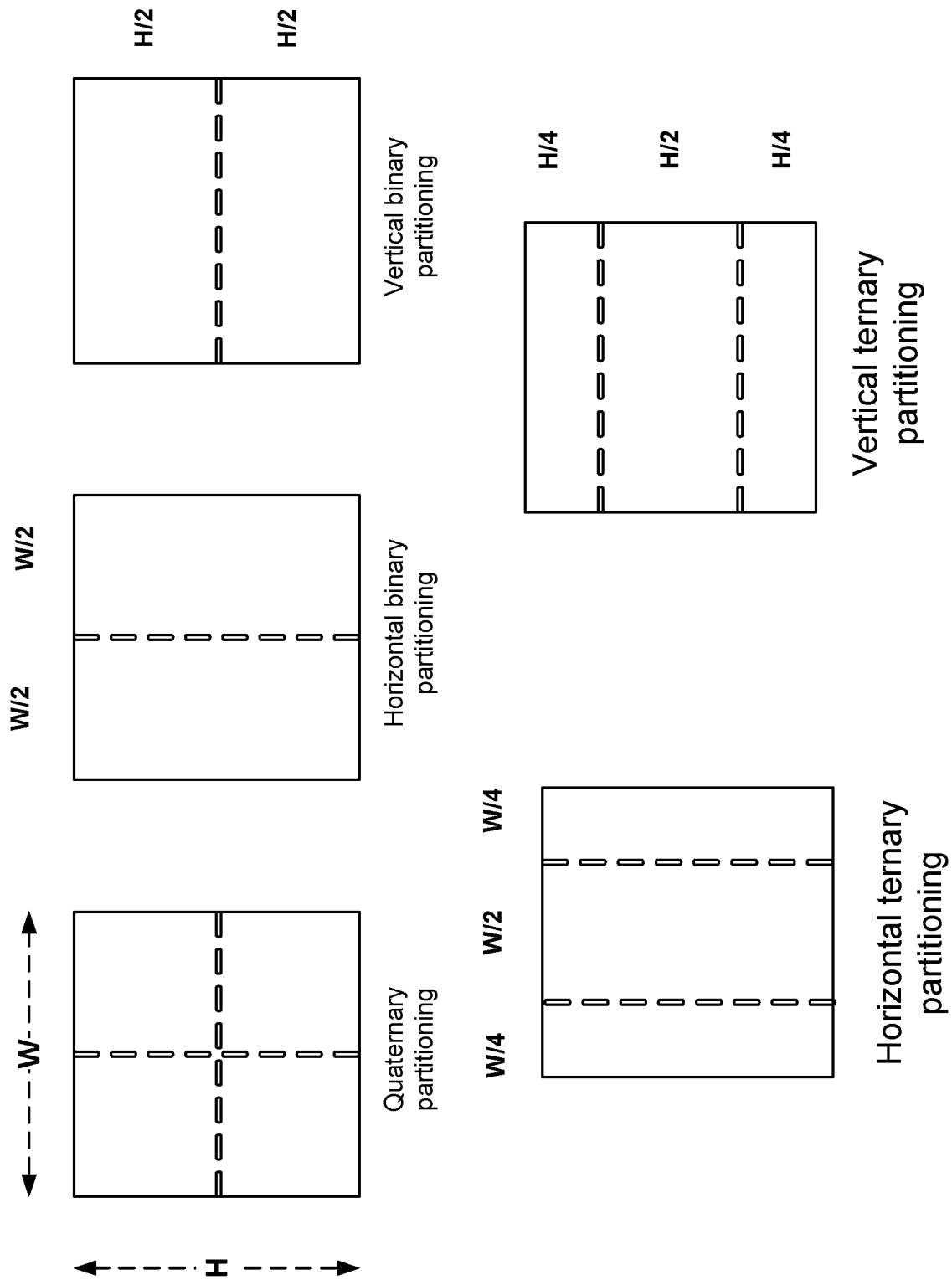

To achieve a better performance, video encoder 20 may recursively perform tree partitioning such as binary-tree partitioning, ternary-tree partitioning, quad-tree partitioning or a combination of the above on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more MxN prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5A:
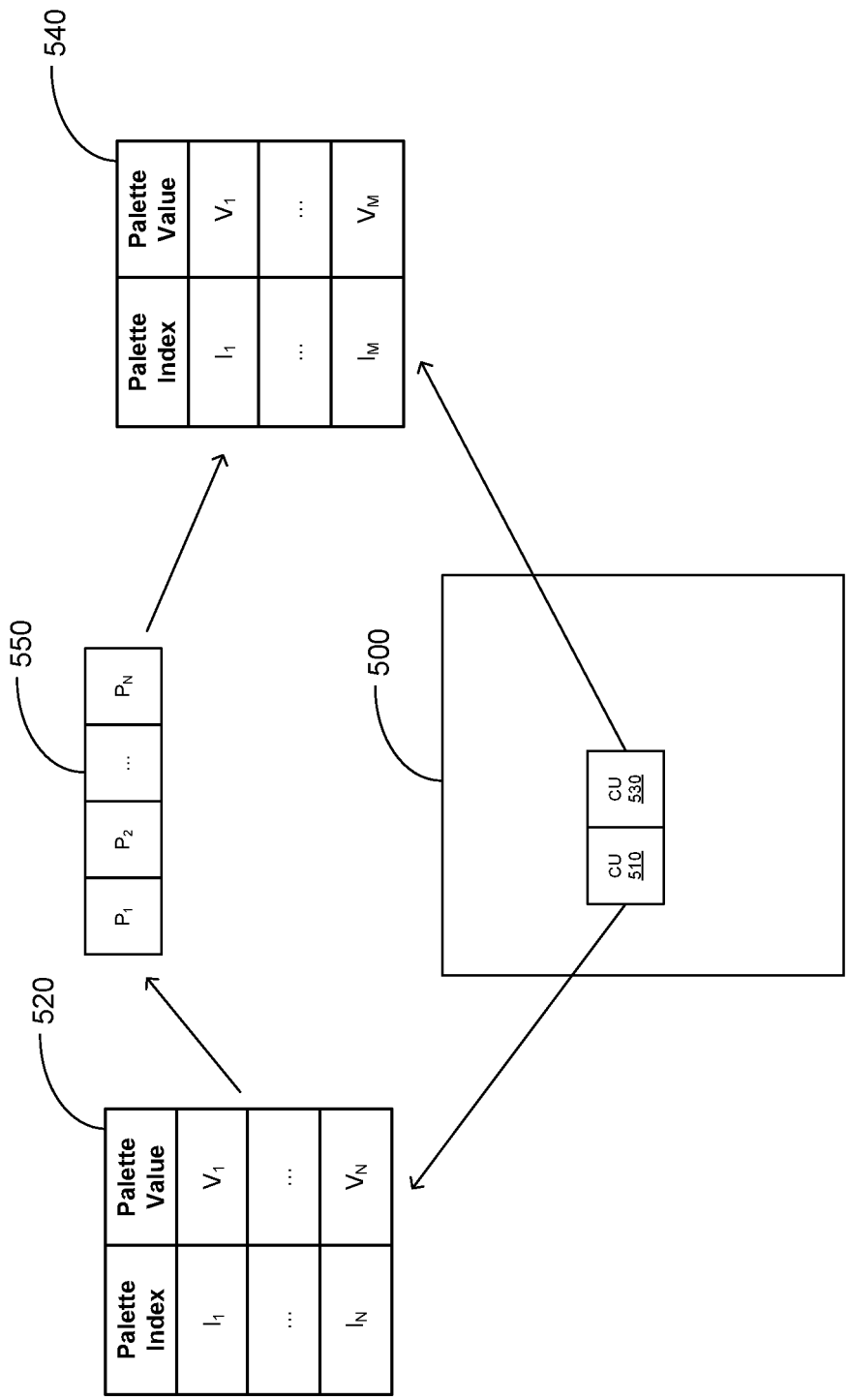
FIG. 5A is a block diagram illustrating an example of determining and using a palette table for coding video data in accordance with some implementations of the present disclosure.

FIG. 5A is a block diagram illustrating an example of determining and using a palette table for coding video data in a picture 500 in accordance with some implementations of the present disclosure. The picture 500 includes a first block 510 that is associated with a first palette table 520 and a second block 530 that is associated with a second palette table 540. Because the second block 530 is on the right side of the first block 510, the second palette table 540 may be determined based on first palette table 520. A palette predictor 550 is associated with the picture 500 and used for storing palette entries dominant in the first block 510 from the first palette table 520 and constructing palette entries in the second palette table 540. Note that the various blocks depicted in FIG. 5A may correspond to CTUs, CUs, PUs, or TUs as described above and the blocks are not limited to the block structure of any particular coding standard and may be compatible with future block-based coding standards.

In general, a palette table includes a number of pixel values that are dominant and/or representative for a block currently being coded (e.g., block 510 or 530 in FIG. 5A). In some examples, a video coder (e.g., video encoder 20 or video decoder 30) may code palette tables separately for each color component of a block. For example, video encoder 20 may encode a palette table for a luma component of a block, another palette table for a chroma Cb component of the block, and yet another palette table for the chroma Cr component of the block. In this case, the first palette table 520 and the second palette table 540 each may become multiple palette tables, each table corresponding to a particular color component. In other examples, video encoder 20 may encode a single palette table for all color components of a block. In this case, an i-th entry in the palette table is a triple value of (Yi, Cbi, Cri), where each value corresponds to one component of a pixel. Accordingly, the representation of the first palette table 520 and the second palette table 540 is merely one example and not intended to be limiting.

As described in the present disclosure, rather than directly coding the actual pixel values of the first block 510, a video coder (such as video encoder 20 or video decoder 30) may use a palette-based coding scheme to code the pixels of the first block 510 using the indices $I_1, \ldots, I_N$. For example, for each pixel in the first block 510, video encoder 20 may encode an index value for the pixel, where the index value is associated with a pixel value, e.g., $V_1, \ldots, V_N$, in the first palette table 520. Video encoder 20 may encode the first palette table 520 and transmit it in an encoded video data bitstream for use by video decoder 30 for palette-based decoding at the decoder side. In general, one or more palette tables may be transmitted for each block or may be shared among different blocks. Video decoder 30 may obtain the index values from a video bitstream generated by video encoder 20 and reconstruct the pixel values using the index values' corresponding pixel values in the first palette table 520. In other words, for each respective index value for a block, video decoder 30 may determine an entry in the first palette table 520. Video decoder 30 then replaces the respective index value in the block (e.g., in the form of an index map as described below in connection with FIG. 5B) with the pixel value specified by the determined entry in the first palette table 520.

In some implementations, a video coder (e.g., video encoder 20 or video decoder 30) determines the second palette table 540 based, at least in part, on the palette predictor 550 associated with the picture 500. The palette predictor 550 may include some or all of the entries of the first palette table 520 and possibly include entries from other palette tables as well. In some examples, the palette predictor 550 is implemented using a first-in-first-out (FIFO) table, where upon adding the entries of the first palette table 520 to the palette predictor 550, the oldest entries currently in the palette predictor 550 are expunged to keep the palette predictor 550 at or below a maximum size. In other examples, the palette predictor 550 may be updated and/or maintained using different techniques.

In one example, video encoder 20 may encode a pred-palette flag for each block (e.g., second block 530) to indicate whether the palette table for the block is predicted from one or more palette tables associated with one or more other previously coded blocks, such as the neighboring block 510. For example, when the value of such a flag is a binary one, video decoder 30 may determine that the second palette table 540 for the second block 530 are predicted from one or more previously decoded palette tables and therefore no new palette table for the second block 540 is included in the video bitstream containing the pred_palette_flag. When such a flag is a binary zero, video decoder 30 may determine that the second palette table 540 for the second block 530 is included in the video bitstream as a new palette table. In some examples, pred_palette_flag may be separately coded for each color component of a block (e.g., three flags, one for Y, one for Cb, and one for Cr, for a video block in the YCbCr space). In other examples, a single pred_palette_flag may be coded for all color components of a block.

In the example above, the pred_palette_flag is signaled per-block to indicate that every entry of the palette table for the current block is predicted. This means that the second palette table 540 is identical to the first palette table 520 and no additional information is signaled. In other examples, one or more syntax elements may be signaled on a per-entry basis, i.e., a flag may be signaled for each entry of a previous palette table to indicate whether that entry is present in the current palette table. If a palette entry is not predicted, the palette entry may be explicitly signaled. These two methods could be combined.

When predicting the second palette table 540 according to the first palette table 520, video encoder 20 and/or video decoder 30 may locate a block from which the predictive palette table is determined. The predictive palette table may be associated with one or more neighboring blocks of the block currently being coded, i.e., the second block 530. As depicted in FIG. 5A, video encoder 20 and/or video decoder 30 may locate a left neighboring block, i.e., the first block 510, when determining a predictive palette table for the second block 530. In other examples, video encoder 20 and/or video decoder 30 may locate one or more blocks in other positions relative to the second block 530, such as an upper block in the picture 500. In another example, the palette table for the last block in the scan order that used the palette mode may be used as a predictive palette table for the second block 530.

Video encoder 20 and/or video decoder 30 may determine a block for palette prediction according to a predetermined order of block locations. For example, video encoder 20 and/or video decoder 30 may initially identify the left neighboring block, i.e., the first block 510, for palette prediction. If the left neighboring block is not available for prediction (e.g., the left neighboring block is coded with a mode other than a palette-based coding mode, such as an intra-prediction mode or inter-prediction mode, or is located at the left-most edge of a picture or slice) video encoder 20 and/or video decoder 30 may identify the upper neighboring block in the picture 500. Video encoder 20 and/or video decoder 30 may continue searching for an available block according to the predetermined order of block locations until locating a block having a palette table available for palette prediction. In some implementations, video encoder 20 and/or video decoder 30 may determine a predictive palette table based on multiple blocks and/or reconstructed samples of a neighboring block by applying one or more formulas, functions, rules or the like to generate a predictive palette table based on the palette tables of one or a combination of a plurality of neighboring blocks (spatially or in scan order). In one example, a predictive palette table that includes palette entries from one or more previously coded neighboring blocks includes a number of entries, N. In this case, video encoder 20 first transmits a binary vector, V, having the same size as the predictive palette table, i.e., size N, to video decoder 30. Each entry in the binary vector indicates whether the corresponding entry in the predictive palette table will be reused or copied to the palette table for the current block. For example, V(i)=1 means that the i-th entry in the predictive palette table for the neighboring block will be reused or copied to the palette table for the current block, which may have a different index in the current block.

In still other examples, video encoder 20 and/or video decoder 30 may construct a candidate list including a number of potential candidates for palette prediction. In such examples, video encoder 20 may encode an index to the candidate list to indicate the candidate block in the list from which the current block used for palette prediction is selected. Video decoder 30 may reconstruct the candidate list in the same manner, decode the index, and use the decoded index to select the palette table of the corresponding candidate block for use with the current block. In another example, the palette table of the indicated candidate block in the list may be used as a predictive palette table for per-entry prediction of a palette table for the current block.

In some implementations, one or more syntax elements may indicate whether palette tables, such as the second palette table 540, are predicted entirely from a predictive palette table (e.g., the first palette table 520, which may be composed of entries from one or more previously coded blocks) or whether particular entries of the second palette table 540 are predicted. For example, an initial syntax element may indicate whether all the entries in the second palette table 540 are predicted. If the initial syntax element indicates that not all of the entries are predicted (e.g., a flag having a value of binary zero), one or more additional syntax elements may indicate which entries of second palette table 540 are predicted from the predictive palette table.

In some implementations, the size of a palette table, e.g., in terms of the number of pixel values that are included in the palette table may be fixed or may be signaled using one or more syntax elements in an encoded bitstream.

In some implementations, video encoder 20 may code the pixels of a block without exactly matching the pixel values in a palette table to the actual pixel values in the corresponding block of video data. For example, video encoder 20 and video decoder 30 may merge or combine (i.e., quantize) different entries in the palette table when the pixel values of the entries are within a predetermined range of each other. In other words, if there is already an existing pixel value in the palette table within an error margin of a new pixel value, the new pixel value is not added to the palette table while the sample in the current block corresponding to the new pixel value is coded with the index of the existing pixel value. Note that this process of lossy coding has no impact on the operation of video decoder 30, which may decode pixel values in the same manner, regardless of whether a particular palette table is lossless or lossy.

In some implementations, video encoder 20 may select an entry in a palette table as a predictive pixel value for encoding a pixel value in a block. Next video encoder 20 may determine a difference between the actual pixel value and the selected entry as a residual and encode the residual. Video encoder 20 may generate a residual block including the residual values for pixels in the block predicted by entries in the palette table and then apply transformation and quantization to the residue block (as described above in connection with FIG. 2). In this manner, video encoder 20 may generate quantized residual transform coefficients. Video decoder 30 may inverse transform and inverse quantize the transform coefficients to reproduce the residual block and then reconstruct a pixel value using the predictive palette entry value and the residual value for the pixel value. In another example, the residual block may be coded losslessly (without transform and quantization) or without transform.

In some implementations, video encoder 20 may determine an error threshold, referred to as a delta value, for constructing a palette table. For example, if an actual pixel value for a position in a block produces an absolute difference between the actual pixel value and an existing pixel value entry in the palette table that is less than or equal to the delta value, video encoder 20 may send an index value to identify a corresponding index of the pixel value entry in the palette table for use in reconstructing the actual pixel value for that position. If an actual pixel value for a position in a block produces absolute difference values between the actual pixel value and the existing pixel value entries in the palette table that are greater than the delta value, video encoder 20 may send the actual pixel value and add the actual pixel value to the palette table as a new entry in the palette table. To construct the palette table, video decoder 30 may use delta values signaled by the encoder, rely on a fixed or known delta value, or infer or derive a delta value.

As noted above, video encoder 20 and/or video decoder 30 may use coding modes including an intra-prediction mode, an inter-prediction mode, a lossless coding palette mode, and a lossy coding palette mode when coding video data. Video encoder 20 and video decoder 30 may code one or more syntax elements indicating whether the palette-based coding is enabled. For example, at each block, video encoder 20 may encode a syntax element indicating whether a palette-based coding mode is to be used for the block (e.g., a CU or a PU). For example, this syntax element may be signaled in an encoded video bitstream at the block level (e.g., a CU level), and then received by video decoder 30 upon decoding the encoded video bitstream.

In some implementations, the above-described syntax elements may be transmitted at a higher level than the block level. For example, video encoder 20 may signal such syntax elements at a slice level, a tile level, a PPS level, or a SPS level. In this case, a value equal to one indicates that all of the blocks at or below this level are encoded using the palette mode such that no additional mode information, e.g., palette mode or other modes, is signaled at the block level. A value equal to zero indicates that none of the blocks at or below this level are encoded using the palette mode.

In some implementations, the fact that a syntax element enabling the palette mode at the higher level does not mean each block at or below this higher level has to be coded with the palette mode. Rather, another CU-level or even TU-level syntax element may still be required to indicate whether the block at the CU or TU level is coded with the palette mode and if so, a corresponding palette table is to be constructed. In some implementations, video coder (e.g., video encoder 20 and video decoder 30) chooses a threshold value (e.g., 32) in terms of the number of samples within a block for minimum block size such that no palette mode is allowed for a block whose block size below the threshold value. In this case, there is no signaling of any syntax element for such block. Note that the threshold value for the minimum block size can be explicitly signaled in the bitstream or implicitly set to be a default value complied by both video encoder 20 and video decoder 30.

The pixel value at one position of a block may be the same as (or within the delta value of) pixel values at other positions of the block. For example, neighboring pixel positions of a block may share the same pixel value or may be mapped to the same index value in the palette table. Accordingly, video encoder 20 may encode one or more syntax elements indicating a number of consecutive pixels or index values in a given scan order that have the same pixel value or index value. The string of like-valued pixel or index values may be referred to herein as a "run". For example, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

In some implementations, one or more flags are used for indicating the relationship between a pixel and its neighboring pixels. For example, a first flag having a value "1" indicates that the pixel and its previous pixel in a given scan order have the same pixel or index value; and the first flag having a value "0" indicates that the pixel and its previous pixel do not have the same pixel or index value. In the second case, a second flag is used for indicating the relationship between the pixel and another pixel that is above the pixel. For example, a second flag having a value "1" indicates that the pixel and the pixel above have the same pixel or index value, which is referred to as "copy_above mode"; and the second flag having a value "0" indicates that the pixel and the pixel above do not have the same pixel or index value, therefore requiring a new index value for the pixel.

Figure 5B:
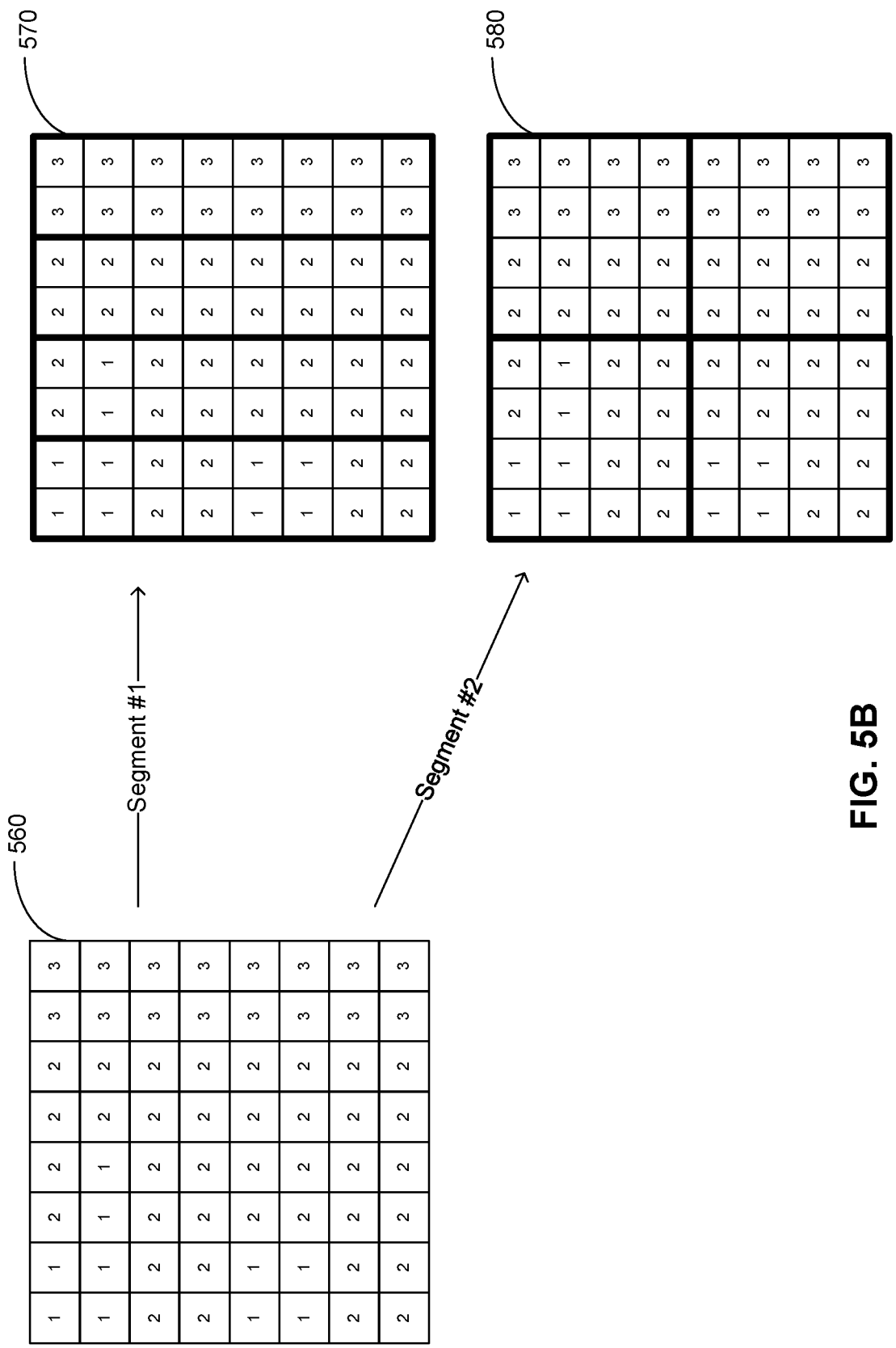
FIG. 5B is a block diagram illustrating an example of dividing a coding block into multiple segments according to different segmentation schemes in a segment-based palette mode in accordance with some implementations of the present disclosure.

Palette table itself is not sufficient for coding a block in palette mode because it merely contains a number of unique pixel values for the block. Palette table needs to be combined with a palette index map or index map for coding a block in palette mode. As depicted in FIG. 5B, an index map 560 has the same size as the block, each position in the index map corresponding to a pixel in the block and having a corresponding index value in the palette table. Video encoder 20 encodes the index map 560 in the video bitstream so that video decoder 30 can reconstruct the index map 560 and replace each index value in the index map with a corresponding pixel value from the palette table for reconstructing the block.

In some implementations, a segment based palette mode is proposed to improve CABAC coding throughput under palette mode. As depicted in FIG. 5B, a CU corresponding to the index map 560 is divided into multiple segments according to different segmentation schemes (e.g., 570 and 580) with each segment containing a number of samples (e.g. M samples) under palette mode. In one example, M is positive number such as 128, 256, 512 and/or 1024. The selection of the value of M is based on the throughput requirement. The smaller the value of M, the better the throughput, but also the greater the impact on coding performance. For each segment, CABAC-related operations such as parsing and/or coding of palette related syntaxes such as index modes, palette index values, and quantized colors for escape mode, etc., are independent of other segments of the same CU. To achieve this, the CABAC operations such as parsing dependency (e.g., the context modeling) and decoding dependency (e.g., the copy-above mode) under palette mode are disallowed across neighboring segments. In other words, the CABAC engine is independently initialized in each segment, and syntaxes in one segment are coded without using any information from other segments as contexts.

In some implementations, different methods may be used to divide the CU into multiple segments under palette mode. In one example, the CU 560 under the palette mode is divided into multiple segments 570 based on the traverse scan order, i.e. the first M samples along the scan order is grouped into segment 1, and the second M samples along the scan order is grouped into segment 2, and so on. In another example, the CU 560 under palette mode may be divided into multiple segments 580 based on binary tree or quad tree partition structure. Within each segment, a traverse scan order may still be used for palette coding.

In some implementations, the palette table may be coded jointly and shared for all the different segments in the CU 560, or coded separately with a palette table signaled for each segment. Different methods may be used to code a palette table. For example, the number of index values for the segment is first signaled, which is then followed by signaling of the actual index values for the entire segment using truncated binary coding. Both the number of indices as well as the index values are coded in bypass mode by grouping the index-related bypass bins together. Then the run is signaled. Finally, the component escape values corresponding to the escape samples for the entire segment are grouped together and coded in bypass mode. The segment based palette mode significantly reduces the size of a buffer needed for storing index values and index maps under palette mode, therefore lowering the requirement on the hardware support for the palette mode in some applications. For each segment, the buffer of palette related data such as index map and palette index value is independent of other segments of the same CU.

In some implementations, different coding tree partition schemes may be applied to different color components of a coding block. For example, the luma component of a CTU is partitioned into CUs by one coding tree partition scheme and the chroma components of the CTU are partitioned into chroma CUs by another coding tree partition scheme. Correspondingly, there are two index maps under palette mode, one for luma component and the other one for two chroma components. Index maps of different color components under palette mode may be predicted in a cross-component manner. In one example, the chroma index maps may be predicted using the corresponding luma palette index map. For example, a special mode may be signaled in which the chroma index maps are the same as the corresponding luma palette index map. In this case, only the luma palette index map is signaled and there is no need to explicitly signal the chroma palette index map. In another example, the corresponding luma palette index map may be used as a predictor for the chroma palette index map, and the difference between the predictor and the actual chroma palette index map may be coded and signaled in the bitstream.

In some implementations, a flag may be used to indicate whether the cross-component palette index map prediction is used or not under palette mode. When the flag value is 1, the index map of two chroma components is predicted from the luma palette index map signaled in the bitstream. When the flag value is zero, the index maps for luma and chroma are separately signaled without using prediction from each other.

Figure 6:
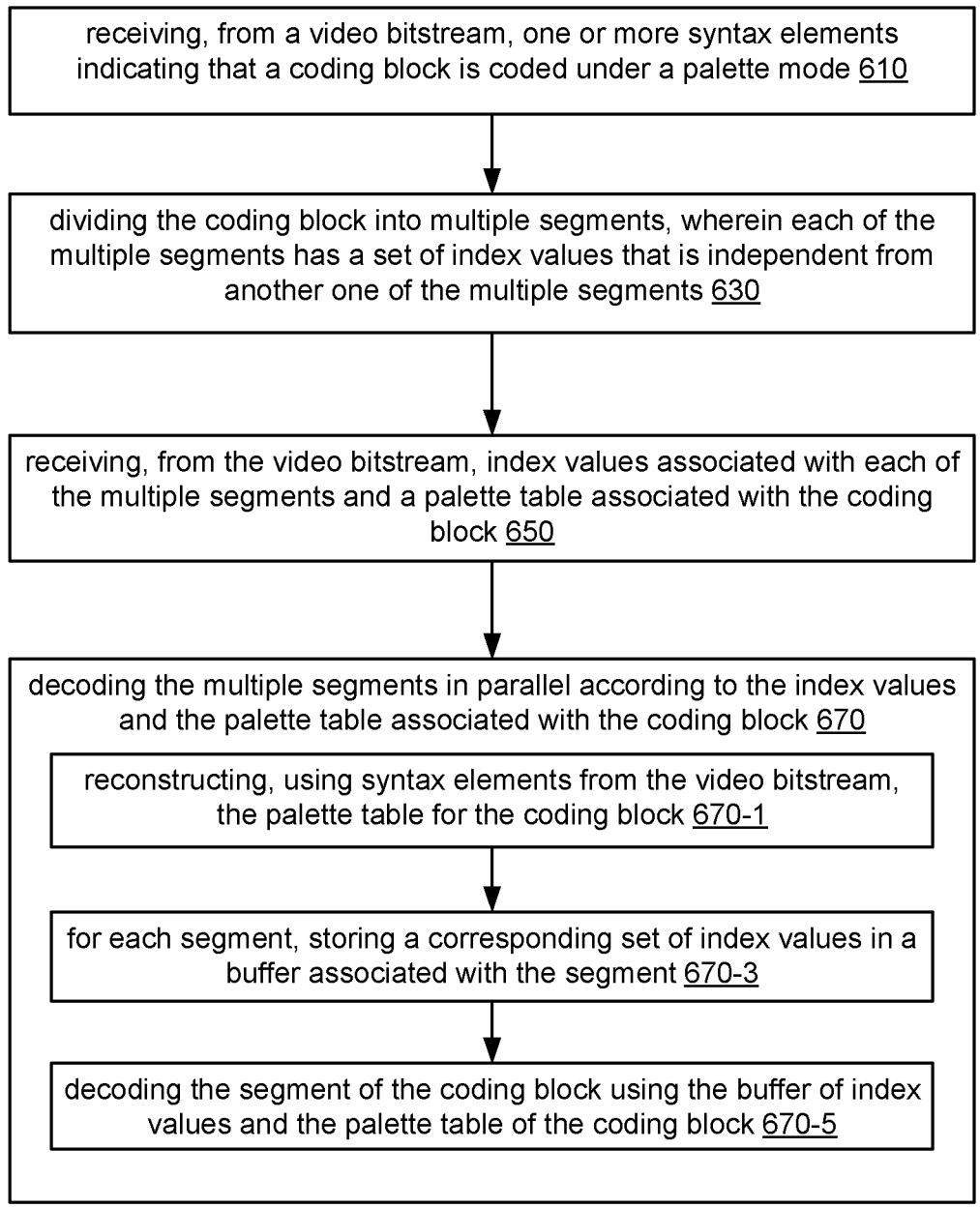
FIG. 6 is a flowchart illustrating an exemplary process by which a video decoder implements the techniques of decoding video data using the segment-based palette mode in accordance with some implementations of the present disclosure.

As a summary of the present disclosure, FIG. 6 is a flowchart illustrating an exemplary process 600 by which a video decoder 30 implements the techniques of decoding video data using the segment-based palette mode in accordance with some implementations of the present disclosure. Video decoder 30 receives (610), from a video bitstream, one or more syntax elements indicating that a coding block is coded under a palette mode. Note that video decoder 30 may or may not need to have a specific syntax element for invoking the segment-based palette mode. For example, the segment-based palette mode may be a default one when the palette mode is enabled. Alternatively, a specific syntax element may be required for invoking the segment-based palette mode if the default palette mode does not require the division of the coding block into multiple segments. In some implementations, the one or more syntax elements indicate that the coding block is divided into the multiple segments according to a predefined traverse scan order of the coding block, which can be a vertical traverse scan order or a horizontal traverse scan order. In some other implementations, the one or more syntax elements indicate that the coding block is divided into the multiple segments according to a predefined tree partition structure of the coding block, which can be a binary-tree partition structure or a quad-tree partition structure.

Assuming that the segment-based palette mode is activated, video decoder 30 divides (630) the coding block into multiple segments, each of the multiple segments has a set of index values that is independent from another one of the multiple segments. For example, every one of the multiple segments has a number of pixels ranging from 16 to 1024. Next, video decoder 30 receives (650), from the video bitstream, index values associated with each of the multiple segments and a palette table associated with the coding block. As noted above, one benefit of the segment-based palette mode is that the buffer size required for storing the index map and palette entries for a particular segment can be reduced significantly when compared with the block-based palette mode. Moreover, since different segments have their own palette related syntaxes such as index maps independent of other segments of the same coding block, it is possible to perform the decoding steps of different segments in parallel. Thus, video decoder 30 decodes (670) the multiple segments in parallel according to the index values in the corresponding index maps and the palette table associated with the coding block.

In some implementations, video decoder 30 first reconstructs (670-1), using syntax elements from the video bitstream, the palette table for the coding block. For each segment, video decoder 30 stores (670-3) a corresponding set of index values in a buffer associated with the segment and decodes (670-5) the segment of the coding block using the buffer of index values and the palette table of the coding block.

In some implementations, the coding block includes a first color component (e.g., luma) that is partitioned according to a first tree partition scheme (e.g., binary tree) and a second color component (e.g., chroma) that is partitioned according to a second tree partition scheme (e.g., quad-tree) that is distinct or the same from the first tree partition scheme. As noted above, there may be a relationship between the index maps of different components. In this case, video decoder 30 may be able to predict the index map associated with the second component from the index map associated with the first component. For example, video decoder 30 may receive, from the video bitstream, a first palette index map associated with the first color component and a palette index map difference and then predicts a second palette index map for the second color component from the first palette index map and the palette index map difference according to a predefined cross-component palette index map correspondence. In some cases, the two components may share the same index map and there is no palette index map difference in the bitstream. Therefore, video decoder 30 can use the same index map for decoding multiple components.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding video data, the method comprising:
   receiving, from a video bitstream, one or more syntax elements indicating that a coding block is coded under a palette mode;
   dividing the coding block into multiple segments, wherein each of the multiple segments has a set of index values that is independent from another one of the multiple segments;
   receiving, from the video bitstream, index values for each of the multiple segments and a palette table associated with the coding block; and
   decoding the multiple segments in parallel according to the index values and the palette table associated with the coding block,
   wherein index maps of different components of the coding block under palette mode are predicted in a cross-component manner based on a predefined cross-component palette index map correspondence.

2. The method of claim 1, wherein the one or more syntax elements indicate that the coding block is divided into the multiple segments according to a predefined traverse scan order of the coding block.

3. The method of claim 2, wherein the predefined traverse scan order is a vertical traverse scan order or a horizontal traverse scan order.

4. The method of claim 1, wherein the one or more syntax elements indicate that the coding block is divided into the multiple segments according to a predefined tree partition structure of the coding block.

5. The method of claim 4, wherein the predefined tree partition structure is a binary-tree partition structure or a quad-tree partition structure.

6. The method of claim 1, wherein each of the multiple segments has a constant number of pixels.

7. The method of claim 6, wherein the constant number is between 16 and 1024.

8. The method of claim 1, wherein the decoding the multiple segments in parallel according to the index values and the palette table associated with the coding block further comprises:
   reconstructing, using syntax elements from the video bitstream, the palette table for the coding block;
   for each segment, storing a corresponding set of index values in a buffer associated with the segment; and
   decoding the segment of the coding block using the buffer of index values and the palette table of the coding block.

9. The method of claim 1, wherein the coding block includes a first color component that is partitioned according to a first tree partition scheme and a second color component that is partitioned according to a second tree partition scheme that is distinct or the same from the first tree partition scheme, and the method further comprises:
   receiving, from the video bitstream, a first palette index map associated with the first color component and a palette index map difference; and
   predicting a second palette index map for the second color component from the first palette index map and the palette index map difference according to the predefined cross-component palette index map correspondence.

10. The method of claim 9, wherein the second palette index map is the same as the first palette index map.

11. An electronic apparatus comprising:
    one or more processors;
    memory coupled to the one or more processors; and
    a plurality of programs stored in the memory that, when executed by the one or more processors, cause the electronic apparatus to perform acts comprising:

receiving, from a video bitstream, one or more syntax elements indicating that a coding block is coded under a palette mode;

dividing the coding block into multiple segments, wherein each of the multiple segments has a set of index values that is independent from another one of the multiple segments;

receiving, from the video bitstream, index values for each of the multiple segments and a palette table associated with the coding block; and decoding the multiple segments in parallel according to the index values and the palette table associated with the coding block, wherein index maps of different components of the coding block under palette mode are predicted in a cross-component manner based on a predefined cross-component palette index map correspondence.

12. The electronic apparatus of claim 11, wherein the one or more syntax elements indicate that the coding block is divided into the multiple segments according to a predefined traverse scan order of the coding block.

13. The electronic apparatus of claim 12, wherein the predefined traverse scan order is a vertical traverse scan order or a horizontal traverse scan order.

14. The electronic apparatus of claim 11, wherein the one or more syntax elements indicate that the coding block is divided into the multiple segments according to a predefined tree partition structure of the coding block.

15. The electronic apparatus of claim 14, wherein the predefined tree partition structure is a binary-tree partition structure or a quad-tree partition structure.

16. The electronic apparatus of claim 11, wherein each of the multiple segments has a constant number of pixels.

17. The electronic apparatus of claim 16, wherein the constant number is between 16 and 1024.

18. The electronic apparatus of claim 11, wherein the decoding the multiple segments in parallel according to the index values and the palette table associated with the coding block further comprises:

reconstructing, using syntax elements from the video bitstream, the palette table for the coding block;

for each segment, storing a corresponding set of index values in a buffer associated with the segment; and decoding the segment of the coding block using the buffer of index values and the palette table of the coding block.

19. The electronic apparatus of claim 11, wherein the coding block includes a first color component that is partitioned according to a first tree partition scheme and a second color component that is partitioned according to a second tree partition scheme that is distinct or the same from the first tree partition scheme, and the plurality of programs are further executed by the one or more processors, causing the electronic apparatus to perform acts comprising:

receiving, from the video bitstream, a first palette index map associated with the first color component and a palette index map difference; and predicting a second palette index map for the second color component from the first palette index map and the palette index map difference according to the predefined cross-component palette index map correspondence.

20. A non-transitory computer readable storage medium storing a plurality of programs for execution by an electronic apparatus having one or more processors, wherein the plurality of programs, when executed by the one or more processors, cause the electronic apparatus to perform acts comprising:

receiving, from a video bitstream, one or more syntax elements indicating that a coding block is coded under a palette mode;

dividing the coding block into multiple segments, wherein each of the multiple segments has a set of index values that is independent from another one of the multiple segments;

receiving, from the video bitstream, index values for each of the multiple segments and a palette table associated with the coding block; and decoding the multiple segments in parallel according to the index values and the palette table associated with the coding block, wherein index maps of different components of the coding block under palette mode are predicted in a cross-component manner based on a predefined cross-component palette index map correspondence.

* * * * *